(12) United States Patent     (10) Patent No.: US 8,542,294 B2
Bhatt et al.     (45) Date of Patent: *Sep. 24, 2013

(54) ADJUSTING TIME METADATA OF DIGITAL MEDIA ITEMS

(71) Applicant: Apple Inc., Cupertino, CA (US)

(72) Inventors: Nikhil Bhatt, Cupertino, CA (US); Alexander David Wallace, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,506

(22) Filed: Feb. 4, 2013

(65) Prior Publication Data

US 2013/0141612 A1     Jun. 6, 2013

Related U.S. Application Data

(63) Continuation of application No. 12/617,478, filed on Nov. 12, 2009, now Pat. No. 8,390,702.

(51) Int. Cl.
*H04N 5/76*     (2006.01)
(52) U.S. Cl.
USPC ................................ 348/231.3; 348/231.5
(58) Field of Classification Search
USPC ............................. 348/231.99, 231.1–231.5
See application file for complete search history.

(56) References Cited

U.S. PATENT DOCUMENTS

| 6,904,160 | B2 | 6/2005 | Burgess |
| 6,950,662 | B2 | 9/2005 | Kumar |
| 2004/0201702 | A1 | 10/2004 | White |
| 2005/0165543 | A1 | 7/2005 | Yokota |
| 2006/0114336 | A1 | 6/2006 | Liu |
| 2007/0189333 | A1 | 8/2007 | Naaman et al. |

OTHER PUBLICATIONS

Naaman et al., "Automatically Generating Metadata for Digital Photographs with Geographic Coordinates", May 17-22, 2004, pp. 244-245.
IBM, "Camera Attitude Recorder", www.ip.com, IP.com No. IPCOM000154729D, Jul. 13, 2007.
Amundsen, "Using the Geographical Location of Photos in Mobile Phones", Norwegian university of Science and Technology, Department of computer and Information Science, Master of Science in Computer Science, Jul. 2008.

*Primary Examiner* — Kelly L Jerabek
(74) *Attorney, Agent, or Firm* — Wong, Cabello, Lutsch, Rutherford & Brucculeri, LLP

(57) ABSTRACT

Methods, apparatuses, and systems for adjusting time metadata of digital media items. A digital image captured at a location is associated with a time of capture and a location of capture. It is determined that a time of capture of the digital image is in a preset time zone that is different from a time zone of the location. In response to the determining, multiple locations are provided, each being associated with a respective time zone including a time zone of the location. A selection of a location is received and the time of capture is adjusted based on a time zone associated with the selected location.

23 Claims, 6 Drawing Sheets

ADJUSTING TIME METADATA OF DIGITAL MEDIA ITEMS

CROSS REFERENCE TO RELATED APPLICATIONS

This Application is a continuation of U.S. application Ser. No. 12/617,478 entitled "ADJUSTING TIME METADATA OF DIGITAL MEDIA ITEMS" filed Nov. 12, 2009, which is incorporated by reference in its entirety herein.

BACKGROUND

This specification describes editing digital media items, for example, based on the metadata associated with the digital media items.

Digital media items, for example, digital images, video, audio, and the like, can be captured using various devices, such as digital cameras, digital video recorders, as well as mobile communication devices that incorporate the features of cameras and video recorders. When a captured digital media item is stored, metadata can be associated with the captured item. For example, when a digital image is captured, the image is stored on a data storage device as a data file to which an image name is associated. The name of the data file is stored on the data storage device as image data file metadata. Metadata can additionally camera settings, data and time of capture, and the like. In some scenarios, a user of the digital camera can travel to different geographic locations and can capture images at each of these locations. Subsequently, when the user imports the images from the digital camera to a computer, for example, a desktop computer, the associated metadata is imported along with the images for storage on the computer.

SUMMARY

This specification describes technologies relating to adjusting time metadata of digital media items.

In general, an innovative aspect of the invention described here can be implemented as a system that includes an image receiver configured to receive a digital image that includes image data and metadata that includes a time of capture of the digital image. The time of capture lies within a preset time zone. The system includes a location receiver configured to receive location information identifying a location. The location information includes a time of recording of the location information and a reference time zone of the time of recording. The system further includes a processor operatively coupled to the image receiver and the coordinates receiver. The processor is configured to detect an assignment of the digital image to the location. The system also includes a comparison unit configured to determine if the preset time zone is different from the reference time zone. The processor is further configured to display a message indicating a conflict between the time of capture and the time of recording on a display device operatively coupled to the processor, upon determining that the preset time zone is different from the reference time zone.

This, and other aspects, can include one or more of the following features. The preset time zone can be associated with the digital image in response to input. The processor can be associated with the preset time zone. The processor can be configured to associate the time of capture with the preset time zone. The processor can further be configured to transmit the location information to a time zone database operatively coupled to the processor. The time zone database can be configured to store time zones defined for planet earth and location information of locations that lie in each of the stored time zones. The processor can further be configured to receive, from the time zone database, a time zone in which the transmitted location information lies, to adjust the time of capture of the digital image based on the received time zone.

To adjust the time of capture of the digital image based on the received time zone, the processor can further be configured to determine a difference between the received time zone and the preset time zone, and offset the time of capture by the difference. To offset the time of capture by the difference, the processor can be configured to add the difference to the time of capture. The processor can further be configured to receive input to resolve the conflict between the time of capture and the time of recording. The system further includes a time zone database operatively coupled to the processor, the time zone database configured to store time zones defined for planet earth and location information of locations that lie in each of the stored time zones.

Another innovative aspect of the invention described here can be implemented as a computer-implemented method that includes receiving, by data processing apparatus, a digital image captured at a location. The method includes determining, by the data processing apparatus, that a time of capture associated with the digital image is in a preset time zone that is different from a time zone of the location in which the digital image was captured. The digital image is associated with the time of capture. The method includes, providing, by the data processing apparatus, multiple locations, each being associated with a respective time zone, in response to the determining. The multiple locations include the location in which the digital image was captured. The method includes receiving, by the data processing apparatus, a selection of a location from the provided plurality of locations, and adjusting, by the data processing apparatus, the time of capture associated with the digital image based on a time zone associated with the selected location.

This, and other aspects, can include one or more of the following features. Receiving the digital image captured at a location can include receiving the digital image from an image capture device, receiving location information identifying the location from a location capture device, and associating the digital image with the location. The digital image can be associated with the location in response to user input. The location information can include global positioning system (GPS) coordinates identifying the location. Associating the digital image with the location can include storing the GPS coordinates as digital image metadata that includes the time of capture.

The location of capture can be defined by global positioning system (GPS) coordinates recorded at the location. The GPS coordinates can include a GPS time at which the GPS coordinates are recorded. Determining that the time of capture associated with the digital image is in a time zone that is different from a time zone of the location in which the digital images captured can further include transmitting the GPS coordinates recorded at the location to a time zone database that stores GPS coordinates of all locations defined on planet Earth and associated time zones in which each of the GPS coordinates are located, receiving, from the time zone database, a time zone associated with the GPS coordinates recorded at the location, and comparing the received time zone with the preset time zone.

Providing the plurality of locations are arranged in a hierarchy of locations having planet Earth as a root location and geographical locations on planet Earth as node locations. A node location can represent a continent and children locations of the node location represent collections of one or more countries in the continent. The collections can represent corresponding time zones defined for planet Earth. Each collection can be associated with a corresponding cluster of GPS coordinates that collectively identify the one or more countries in the collection. Providing the plurality of locations can include providing a control for each collection. Receiving a selection of a location can further include receiving a selection of a control provided for a collection. The method can further include transmitting GPS coordinates that collectively identify the one or more countries in the collection to a time zone database that stores time zones defined for all geographic locations on planet Earth. Adjusting the time of capture associated with the digital image based on a time zone associated with the selected location can further include receiving, from the time zone database, a time zone defined for the one or more countries in the collection, and comparing the received time zone with the preset time zone. Adjusting the time of capture associated with the digital image can further include determining a difference between the time zone that is associated with the digital image and the time zone of the location in which the digital image was captured, and offsetting the time of capture by the difference.

The time of capture and the location of capture can be associated with the image as metadata. Time metadata representing the time of capture and location metadata representing the location of capture can be associated with the digital image separately. Time metadata representing the time of capture and location metadata representing the location of capture can be associated with the digital image simultaneously.

More innovative aspects of the invention described here can be implemented in a computer-readable medium, tangibly encoding software instructions, executable by data processing apparatus to perform the computer-implemented method described above. Additional innovative aspects of the invention described here can be implemented in a system that includes data processing apparatus and the computer-readable medium described previously.

Particular implementations of the subject matter described in this specification can be implemented to realize one or more of the following potential advantages. When a user captures digital images at a geographic location that lies in a time zone that is different from the time zone in which the user resides, the systems and techniques described here can adjust the time of capture of the digital images based on the time zone in which the user resides. The adjustments can be performed automatically, i.e., upon obtaining an association between a digital image and a geographic location and determining that a time zone in which the digital image was captured is different from the time zone in which geographic location information was captured. In addition, the adjustments can be made in response to user input, for example, by providing a conflict message indicating a difference between time zones to a user, and receiving input from the user to adjust time zones to resolve the conflict.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

Methods, apparatuses, and systems for adjusting time metadata of digital media items are described. The metadata of digital media items, for example, digital images, can include a time of capture and a geographic location of capture. For example, digital images captured using a camera are associated with corresponding time metadata representing times of capture. The digital images captured can also be associated with corresponding geographic locations metadata representing locations of capture, which can be obtained, for example, using global positioning system (GPS) devices. Depending upon the geographic location on planet Earth in which the computer system is located, time zones in which images are captured can be different from the preset time zone. Using the techniques described with reference to the following figures, the time metadata associated with the digital images can be adjusted to correspond to the time zone in which the digital images were captured using the geographic locations metadata. An example of a system for doing so is described with reference to FIG. 1.

Figure 1:
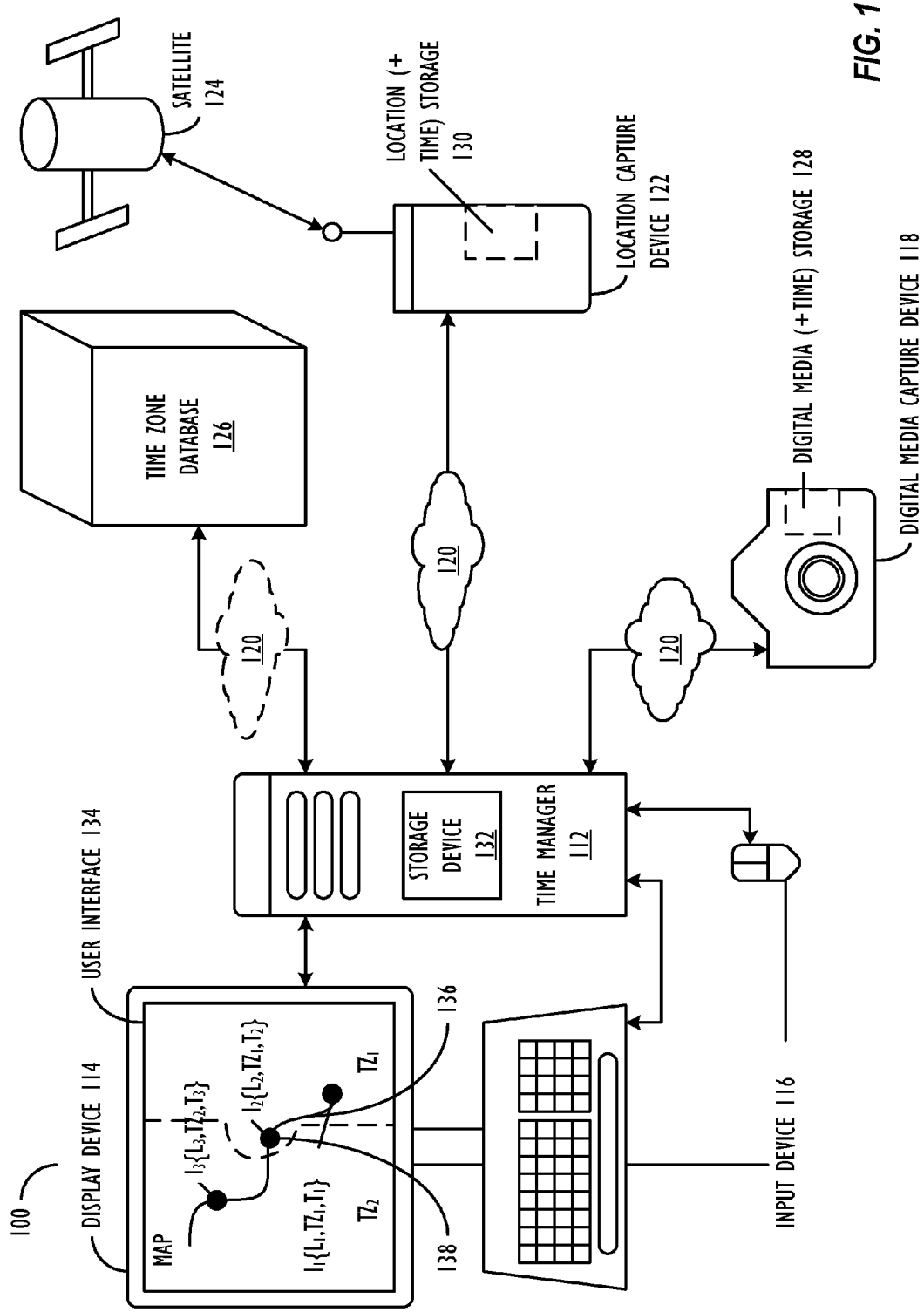
FIG. 1 is an example of a system for presenting digital media items.

FIG. 1 is an example of a system 100 for presenting digital media items. The system 100 includes a time manager 112 operatively coupled to a display device 114 and one or more input devices 116. In some implementations, the time manager 112 is a computer, for example, a desktop computer, a laptop computer, a personal digital assistant (PDA), a mobile communication device, and the like, operatively coupled to a display device 114, for example, a liquid crystal display (LCD) operable using input devices 116 such as a keyboard, a mouse, a stylus, a touchscreen, a touchpad, and the like. The system 100 is operatively coupled to a digital media capture device 118 through one or more wired or wireless networks 120, for example, a Local Area Network (LAN), a Wide Area Network (WAN), a wireless network, Bluetooth, the Internet, and the like.

The system 100 is also operatively coupled, through the networks 120, to a location capture device 122 configured to capture geographic location information. For example, the location capture device 122 is a GPS system configured to interact with a satellite 124 to obtain latitude, longitude, and altitude coordinates of a geographic location at which the location capture device 122 is positioned, and a time at which the coordinates are captured. Additionally, the system 100 is operatively coupled to a time zone database 126. The time zone database 126 includes all the time zones defined for planet Earth and the geographic location information of all the locations within each time zone. For example, the time zone database 126 includes the Pacific Standard Time (PST) zone and all regions in the United States, including the state of California to which the PST zone is associated. In some implementations, the time zone database 126 resides on a storage device, for example, storage device 132. Alternatively, the time zone database 126 resides on an external storage device that is operatively coupled to the time manager 112 either directly or through the networks 120.

In some scenarios, the digital media capture device 118 is used to capture multiple digital media items, for example, digital images, and to store the items on a digital media storage 128. The device 118 associates a time of capture to each digital image as metadata, and stores the metadata on the storage 128. Often, a preset time zone, being the time zone in which a camera user resides, is established for the camera. Subsequently, regardless of a time zone in which the user captures a digital image, a time associated with the captured image is in the preset time zone. For example, if the preset time zone is PST, and an image is captured in GMT, the time associated with the stored image is still in PST. Using known techniques, the time manager 112 can import the digital images and the associated time metadata from the digital media capture device 118 to a storage device 132 operatively coupled to the time manager 112, for example, a hard disk.

In some implementations, a location capture device 122 is used to capture the geographic location information, for example, GPS coordinates. For example, a user positioned at a particular geographic location and/or traveling across multiple geographic locations can carry the location capture device 122, which captures GPS coordinates identifying each geographic location. Typically, the time of capture is in a reference time zone, for example, the GMT time zone. The GPS information and the time that are captured can be stored on a location storage 130 that is operatively coupled to the location capture device 122. The time manager 112 can import the GPS coordinates and the time of capture from the location storage 130 to the storage device 132.

If a user uses the digital media capture device 122 and the location capture device 122 simultaneously, then as the user captures and stores digital media items, for example, digital images, the user also records locations of capture. Once imported, a user can associate the digital image with the location of capture. To do so, in some implementations, the GPS information can be used to generate a track path 136 including multiple points, each representing a location at which GPS coordinates were captured. For example, on a world map displayed in the user interface 134, the track path 136 can be displayed as a line. The user can select and associate a point on the track path 136 with a digital image. Doing so causes the selected image to be displayed as a solid circle 138 on the selected point in the track path 136. When the user associates a digital image with a geographic location, in this manner, the time manager 112 includes the GPS coordinates included with the geographic location to the metadata associated with the digital image. Thus, for each image, $I_1$, the time manager 112 generates a mapping to a location, $I_1$, a time zone, $TZ_1$, and a time of capture, $t_1$.

Because the GPS coordinates include a time of capture that is in a reference time zone, for example, GMT, and because the time of capture is in a preset time zone, conflicts can arise if the preset time zone does not match the reference time zone. The time zone database 126 can be used to resolve such conflicts. The time zone database 126 includes all the time zones that are defined on planet Earth and geographic location information of all the locations within each time zone. In some implementations, the geographic location information can include GPS coordinates including a latitude, longitude, and an altitude of each geographic location. In some implementations, the time zones and respective geographic location information can be generated by a reverse geo-coding process and stored in a lookup table. Each row of the table can include a time zone and GPS coordinates of all locations that lie within.

In some implementations, the time manager 112 provides the location metadata including GPS coordinates associated with a digital image to the time zone database 126, and receives, in response, a time zone in which the GPS coordinates were captured. In implementations in which the time zone database 126 is resides in the time manager 112, the location metadata including the GPS coordinates need not be transmitted to a location external to the time manager 112 to obtain the time zone in which the GPS coordinates were captured. The time manager 112 resolves the conflict in time zones by adjusting the time of capture of the digital image based on a difference between the preset time zone and the time zone received from the time zone database 126. Techniques for doing so are described with reference to FIG. 2.

Figure 2:
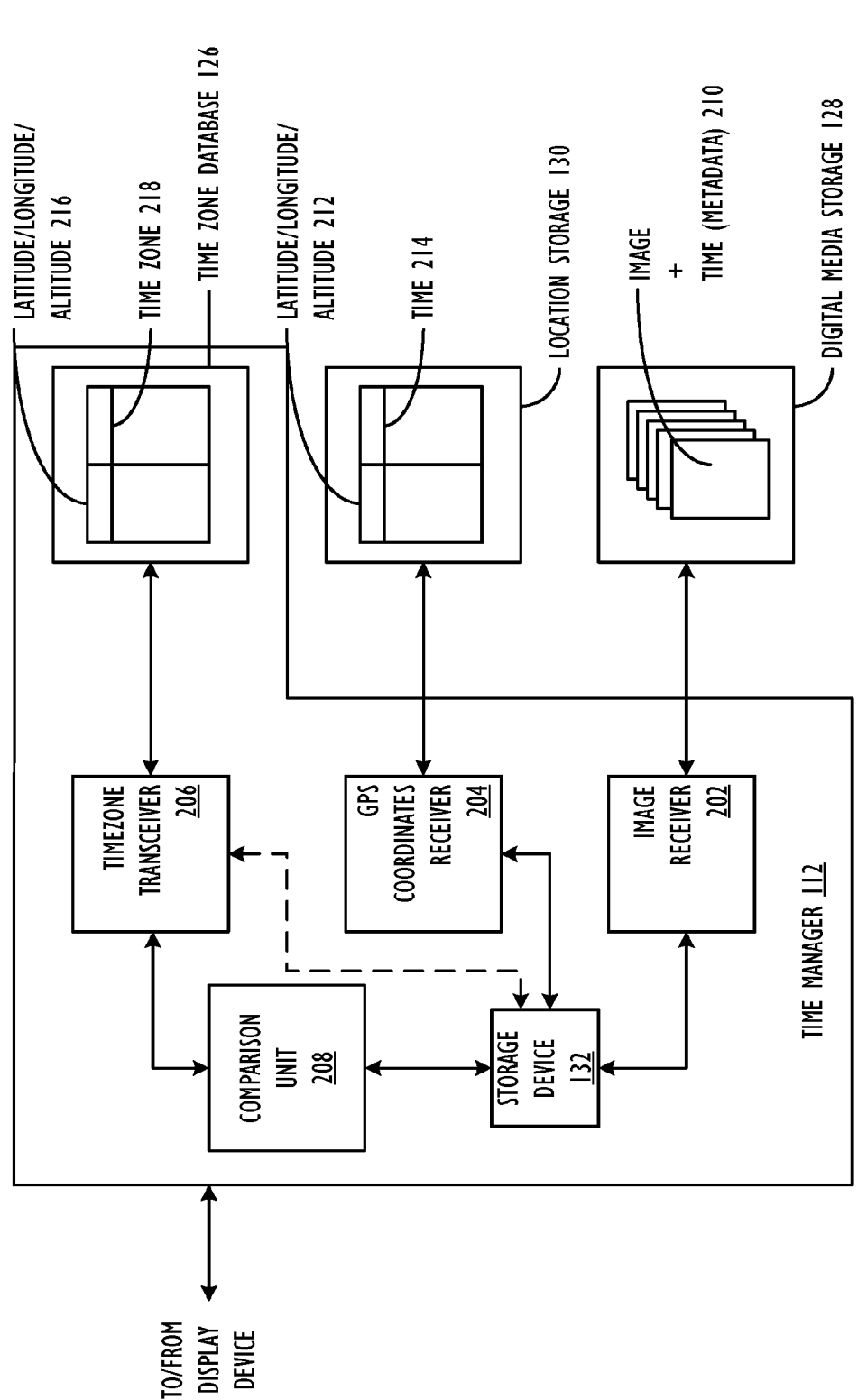
FIG. 2 is an example of a time manager for adjusting time metadata of digital media items.

FIG. 2 is an example of a time manager 112 configured to adjust time metadata of digital media items. The digital media items, for example, digital images, can be stored as data files 210 on the digital media storage 128. The time manager 112 can include an image receiver 202 to receive the data files 210, either collectively or individually, using known file-import operations. The storage device 132 stores each data file 210 that includes image information, for example, pixel data of the digital image, and associated metadata including time metadata. In some implementations, the time manager 112 can include a GPS coordinates receiver 204 to receive the GPS coordinates and time of location capture from the location storage 130. The storage device can store the geographic location information in a same format as the location storage 130, for example, in a table.

The time manager 112 can include a time zone transceiver 206 that is configured to transmit a request to the time zone database 126 that includes GPS coordinates of a particular location or a range of GPS coordinates representing a collection of locations or both. In response to the request, the time manager 112 can receive a time zone stored in the table. For example, if the time manager 112 transmits GPS coordinates of a location in San Francisco, Calif., then the time manager 112 can return the Pacific Standard Time zone. Also, if the time manager 112 transmits a range of GPS coordinates representing all of California, then the time manager 112 can return the Pacific Standard Time zone. If the time manager 112 transmits coordinates of the United States of America (USA), then the time zone database 126 can provide all four time zones defined for USA.

The time manager 112 includes a comparison unit 208 configured to compare the time of capture included in the digital image metadata with the time included with the GPS coordinates metadata of the location to which the digital image has been assigned. If the times match, then the data processing unit 112 can retain the previously associated time as time metadata. If not, then the time manager 112 can obtain new time metadata for the digital image based on the GPS coordinates, from the time zone database 126. Doing so involves user-interface operations that are described with reference to FIG. 3.

Figure 3A:
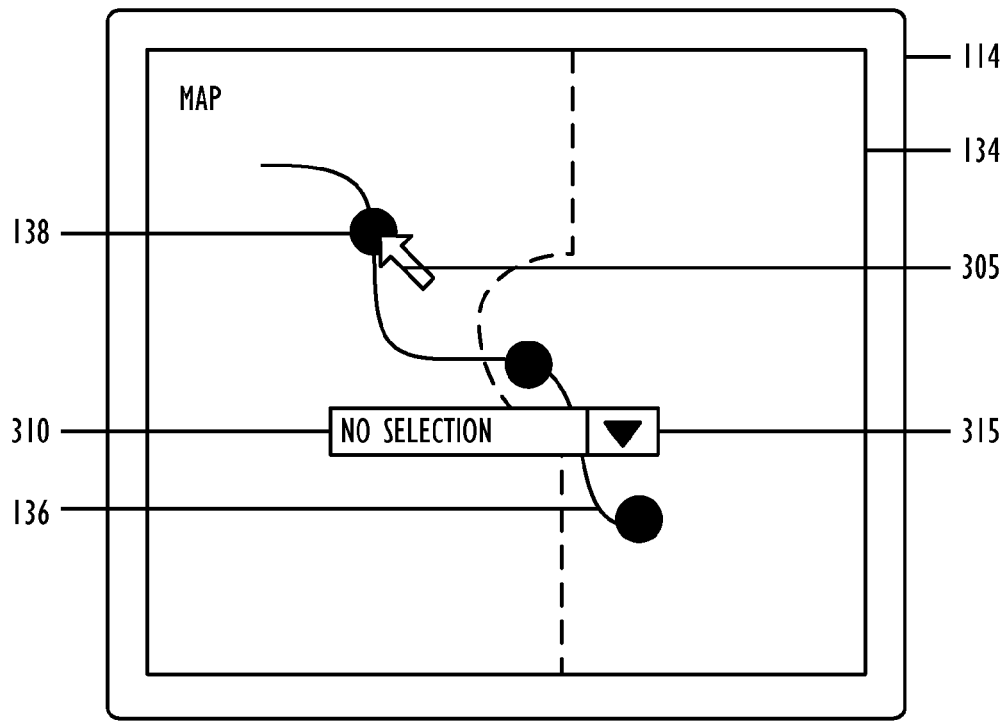
FIGS. 3A and 3B are examples of user interfaces displaying controls to assign a geographic location and time zone to a digital image.
Figure 3B:
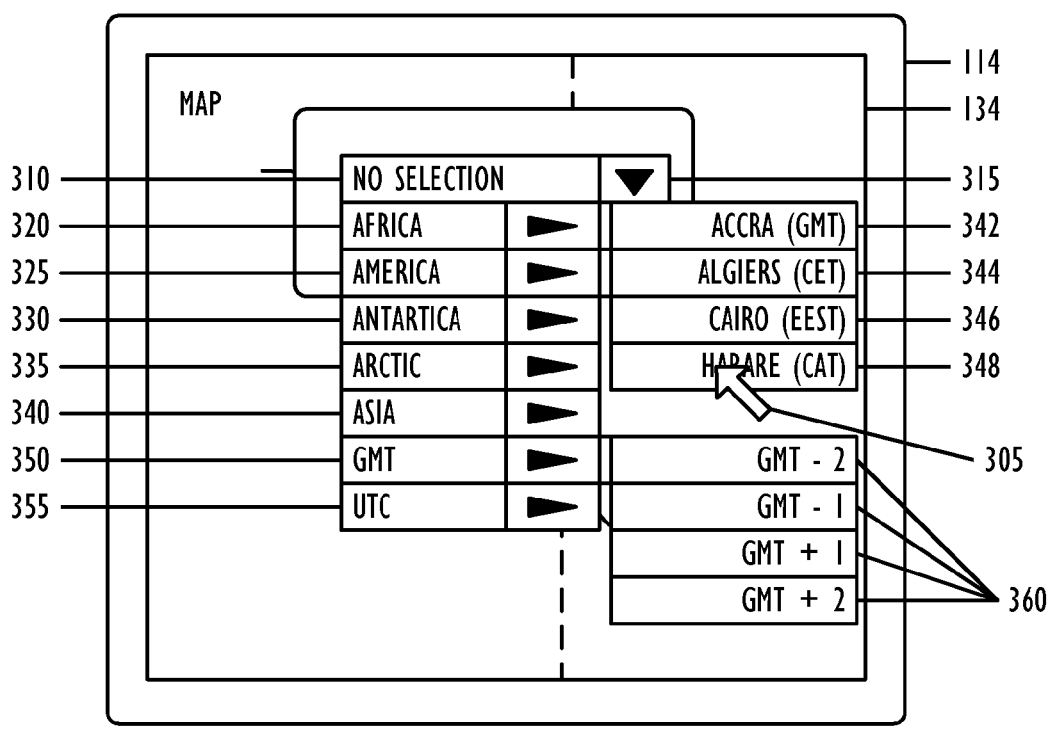

FIGS. 3A and 3B are examples of user interfaces displaying controls to assign a digital image to a geographic location. The time manager 112 displays a map of planet Earth in the user interface 134. The map can be zoomed in and zoomed out to display portions of planet Earth selected by a user. The time manager 112 can display a track path 136 including multiple points representing locations at which the GPS coordinates were captured in the user interface 134. A user assigns a digital image to a point on the track path representing a location at which the digital image was captured. As shown in FIG. 3A, the time manager 112 displays a solid circle 138 representing the digital image at the point on the track path 136. Also, the time manager 112 includes the GPS coordinates of the location to the metadata associated with the digital image. The time manager 112 further accesses time zones from the time zone database 126.

In some implementations, the time manager 112 provides functionalities that allow a user to alter the time of capture to correspond to a time zone of the location of capture. To do so, in response to a selection of the digital image (circle 138) by the user using a cursor 305, the time manager 112 displays a control 310 in the user interface 134. In a default implementation, the time manager 112 displays "No selection" or a similar message in the control 310 indicating that the time of capture associated with the digital image has not been changed. To change the time of capture, the time manager 112 displays selectable controls in the user interface 134.

In some implementations, the control 310 can be a drop-down box accessible using a second control 315. As shown in FIG. 3B, when the user selects the second control 315, multiple selectable controls 320, 325, 330, 335, and 340 can be displayed in the user interface 134, from example, below the control 310. In some implementations, the time manager 112 can display, in each of the displayed controls, a name of a geographic location on planet Earth. Each control can represent either a collection of locations or a single location on planet Earth. For example, control 320, which displays "Africa," can represent all the countries in the African continent. When a user selects control 320, the time manager 112 can display additional controls 342, 344, 346, and 348, each of which is a geographic location in Africa. The geographic locations displayed in FIG. 3B are representative locations and are not exhaustive.

To display the controls, the time manager 112 stores a hierarchy of locations, for example, in a tree structure, in which planet Earth is a root location, countries are children locations, and continents are intermediate node locations. Alternatively, in addition, the hierarchy of locations can be created with further granularity to include states and cities in each country. When a user selects one of the controls displaying a location, the time manager 112 can display additional controls, each displaying the children locations of the selected location. Eventually, the time manager 112 can display the children locations, each of which falls within a time zone defined on planet earth.

Each of the controls that displays geographic location are associated with corresponding GPS coordinates or range of GPS coordinates. For example, control 348 that displays "Harare (CAT)" is associated with a range of GPS coordinates that lie within Harare, Zimbabwe, Africa. If the user captured the digital image in Harare, then the user selects Harare. In response to the selecting, the time manager 112 adjusts the time of capture of the digital image based on the time zone associated with Harare.

To do so, the time manager 112 transmits the range of GPS coordinates associated with the selected control 348 to the time zone database 126. In response, the time zone database 126 provides a time zone of the GPS coordinates in the range. For example, if all GPS coordinates in the range lie in the same time zone, then the time zone database 126 returns one time zone to the time manager 112. The time manager 112 determines a difference between the time zone received from the time zone database 126 and the preset time zone, and offsets the time of capture associated with the digital image by the difference. For example, if the preset time zone is Pacific standard Time and the selected time zone is Eastern standard Time, then the time manager 112 determines a difference of three hours between the two time zones, and subtracts three hours from the time of capture associated with the digital image. In this manner, rather than requiring a user to know a time zone in which the image was captured, the time manager 112 allows the user to adjust time of capture based on the location in which the user captured the image. To do so, the time manager 112 utilizes the time zones stored in the time zone database 126.

In this manner, in response to user input that associates a geographic location with a digital image, the time manager 112 can adjust the time of capture associated with the digital image to fall in the time zone in which the geographic location is located. Subsequently, the time manager 112 can associate and store the adjusted time with the digital image as time metadata. In some implementations, the time manager 112 can store the adjusted time as supplemental time metadata such that the time of capture that was assigned to the image upon capture is also retained. Alternatively, the time manager 112 can override the time metadata associated with the image upon capture with the adjusted time metadata. In some scenarios, as described with reference to FIG. 4, the time manager 112 can provide a user with an option to change time metadata associated with digital media items.

Figure 4:
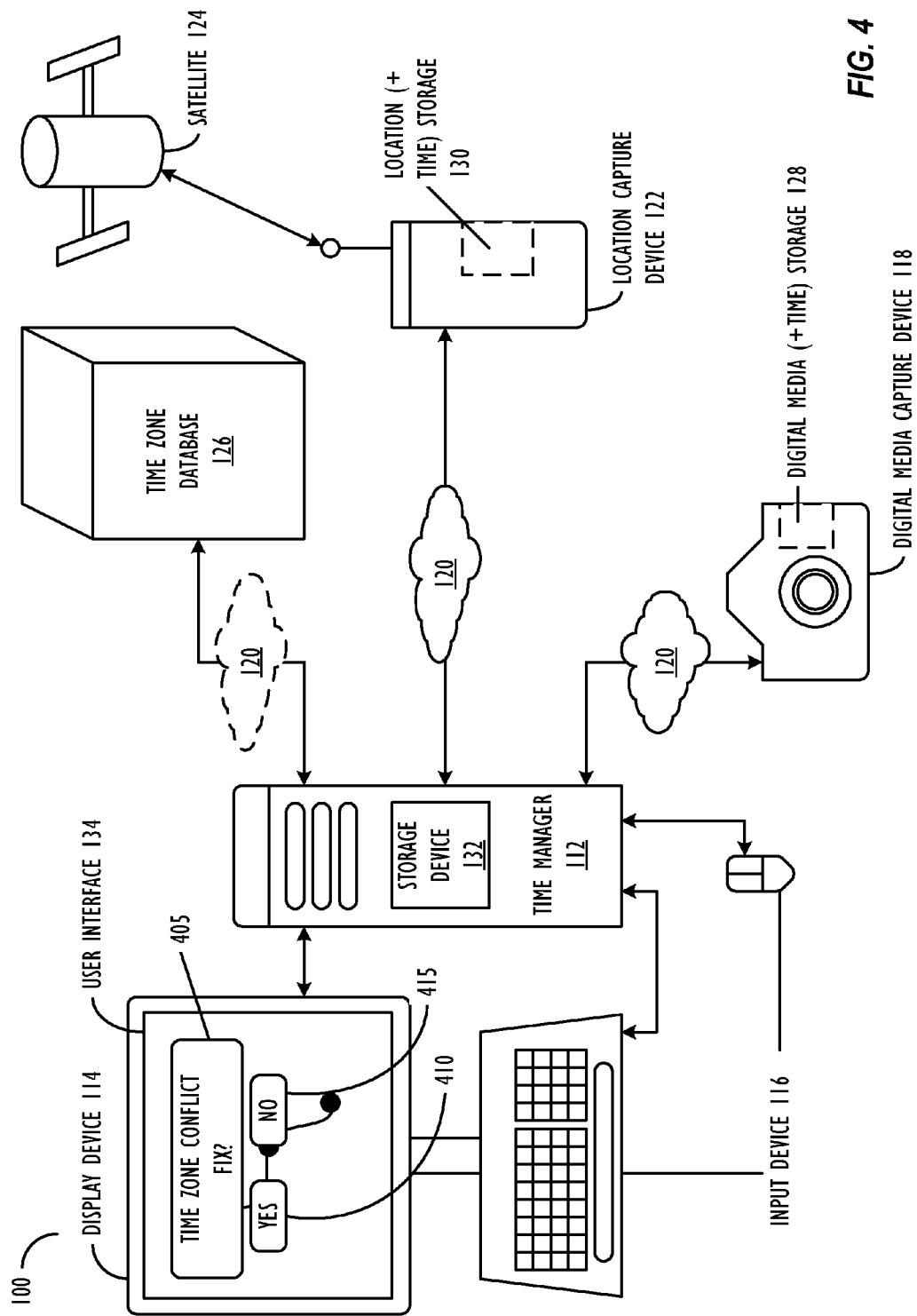
FIG. 4 is an example of a time manager for prompting a user to adjust time associated with a digital image.

FIG. 4 is an example of a time manager 112 for prompting a user to adjust time associated with a digital image. In some implementations, upon adding the GPS coordinates metadata to the digital media item metadata, the time manager 112 can transmit the GPS coordinates to the time zone database 126 and obtain a time zone in which the location represented by the GPS coordinates is located. The time manager 112 can compare the time zone received from the time zone database 126 to a time zone in which the time of capture of the digital media item falls. Upon determining that the two time zones conflict, the time manager 112 can display a conflict message in a text box 405 in the user interface 134. In addition, the time manager 112 can display a message asking the user to fix the conflict.

If the user selects "YES" 410 to fix the conflict, then the time manager 112 can determine a difference between the time zone received from the time zone database 126 and the time zone of the digital media item, and adjust the time of capture based on the difference. Alternatively, if the user selects "NO" 415, then the time manager 112 does not perform any operations to adjust the time of capture. In alternative implementations, if the user selects "NO" 415, then rather than automatically adjusting the time of capture, the time manager 112 can enable the user to perform the techniques described above to manually adjust the time of capture.

Figure 5:
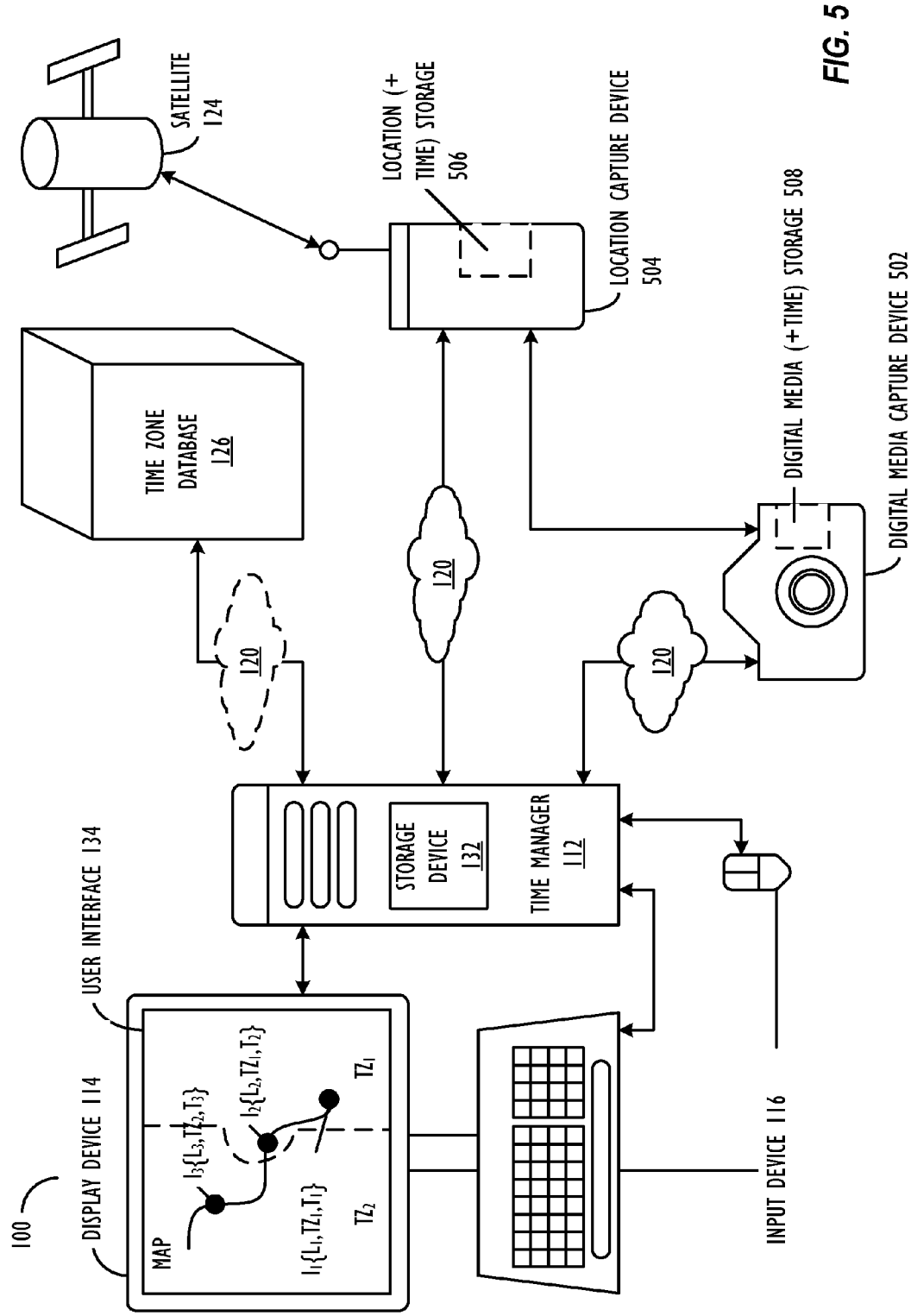
FIG. 5 is an example of a time manager for receiving digital media items to which time and geographic location information have been associated.

FIG. 5 is an example of a time manager 112 for receiving digital media items to which time and geographic location information have been associated. In some implementations, the time manager 112 detects connections to a digital media capture device 502 and a location capture device 504. If the digital media capture device 502 and the location capture device 504 are additionally connected to each other, then the time manager 112 causes the location capture device 504 to transmit the geographic location information, for example, GPS coordinates, stored in the location storage 506, to the digital media storage 508 in the digital media capture device 502. Subsequently, the time manager 112 receives both the time of capture metadata and the GPS coordinates from the digital media capture device 502.

Figure 6:
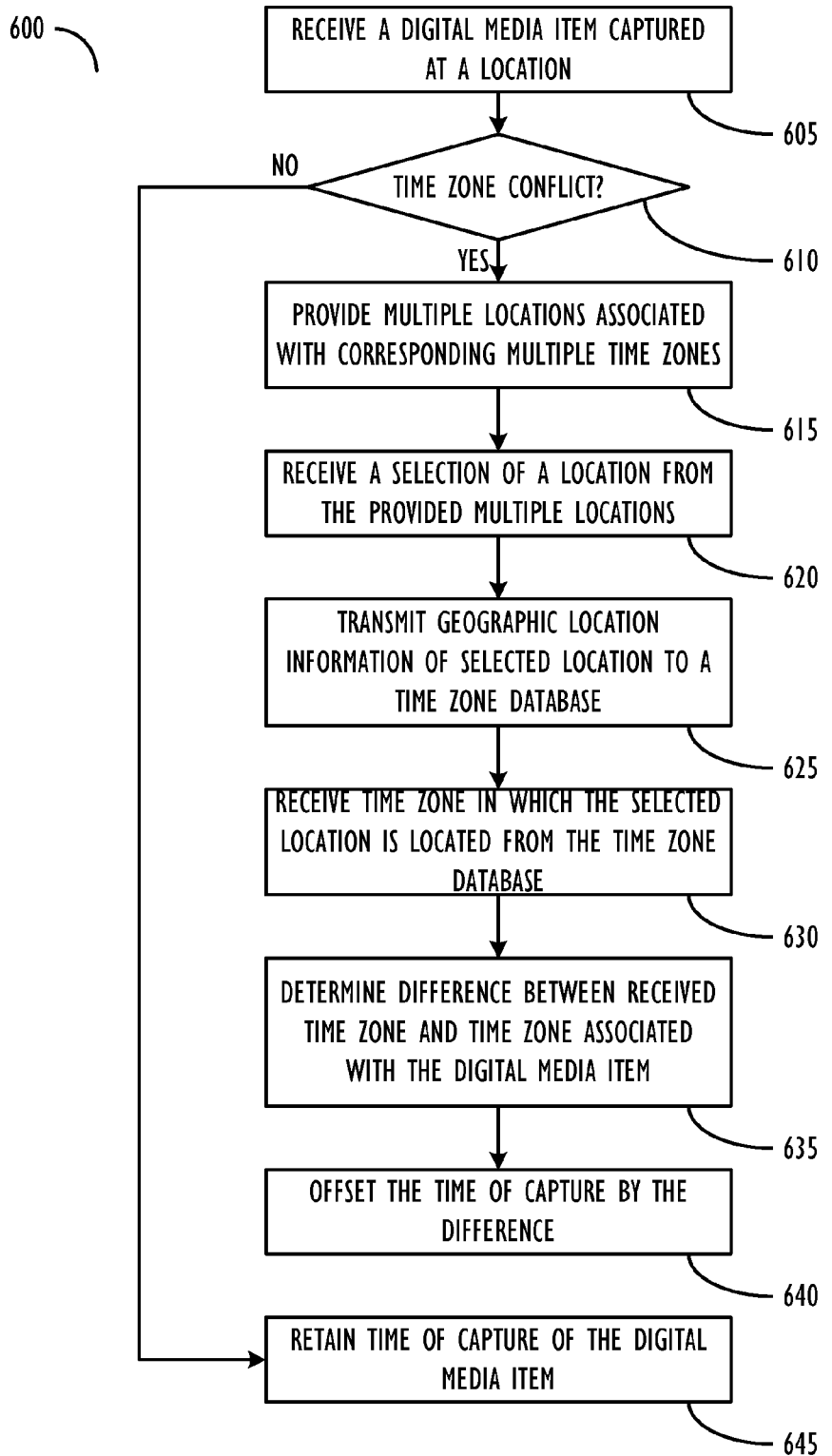
FIG. 6 is a flowchart of an example process for adjusting the time of capture associated with a digital media item.

FIG. 6 is a flowchart of an example process 600 for adjusting the time of capture associated with a digital media item. The process 600 receives a digital media item captured at a location (605). The process 600 checks for a time conflict. A conflict exists when a time of capture associated with the digital media item is in a time zone that is different from a time zone of the location in which the digital image was captured. If a conflict exists, then the process 600 provides multiple locations associated with corresponding multiple time zones (615). The process 600 receives a selection of a location from the provided multiple locations (620). The process 600 transmits geographic location information of the selected location to a time zone database (625). The process 600 receives the time zone in which the selected location is located from the time zone database 630. The process 600 determines the difference between the received time zone and time zone associated with the digital media item (635). The process 600 offsets the time of capture by the difference (640). If the process 600 determines that there is no conflict (610), then the process retains the time of capture of the digital media item (645).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, for example, an FPGA (field programmable gate array) or an ASIC (application specific integrated circuit).

The processes and logic flows can further be implemented by one system of one or more computers to execute another system of one or more computers over one or more wired or wireless networks, such as the Internet. For example, the processes and logic flows can be encoded as one or more computer programs on computer-readable media, which are executed by the other system to perform the processes.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices.

Devices suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's computing device in response to requests received from the web browser.

Embodiments of the subject matter described in this specification can be implemented in a computing system that includes a back end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (for example, an HTML page) to a computing device (for example, for purposes of displaying data and receiving user input from a user interacting with the computing device). Data generated at the computing device (for example, a result of the user interaction) can be received from the computing device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some implementations, the time manager can transmit the time zone of a geographic location to which a digital image has been associated, and a preset time zone to the time zone database 126. The time zone database 126 can compare the two time zones and return a difference between the two to the time manager 112. The data processing apparatus 112 can adjust the time metadata of the digital image based on the returned difference.

In some implementations, the hierarchy of locations can be based on time zones grouped by geographic regions. In such a hierarchy, planet Earth that includes all time zones, is the root location, various continents, each grouping multiple time zones are children locations of the root location, and geographic locations within each continent that either group subsets of time zones represented by the continent or that individually represent a time zone are a next level in the hierarchy. For example, "North America" can be a node location that is in a level below "Earth," and "East," "West," "Mountain," and "Central" can be four geographic regions, each representing "EDT," "PDT," "MDT," and "CDT," respectively.

In some implementations, the time manager 112 can display a control 350 displaying "GMT" that represents Greenwich Mean Time, and a control 355 displaying "UTC" that represents Coordinated Universal Time in the user interface 134. When the user positions the cursor on control 350, the time manager 112 can display multiple selectable controls 360, each representing an hourly deviation from GMT. For example, the multiple controls can display "GMT+1," "GMT+2," "GMT+3," and the like, each representing an offset from GMT. To determine a difference between the selected time zone and the preset time zone, the time manager 112 can convert the time of capture associated with the digital image to GMT and subsequently determine a difference between GMT and the selected time zone. Similar operations can be performed when the control 355 displaying "UTC" is selected.

In some implementations, the time manager 112 can be a server that is operatively coupled, through the networks, for example, the Internet, to a computer to which the display device and the input devices are coupled. The digital media capture device 118, the location capture device 122, and the time zone database 126 can also be operatively coupled to the server through the Internet. The server can be configured to receive input from the computer, for example, input assigning a digital image to a location, and in response, can cause the computer to adjust the time of capture of the digital image using techniques described above.

What is claimed is:
1. A system comprising:
an image receiver configured to receive a digital image, including a time of capture of the digital image corresponding to a preset time zone;
a location receiver configured to receive location information identifying a location, including a time of recording of the location information corresponding to a reference time zone;
a comparison unit configured to compare the preset time zone with the reference time zone; and
a processor operatively coupled to the image receiver and the location receiver, the processor configured to
detect an assignment of the digital image to the location; and
generate an indication of a time zone conflict, responsive to the comparison by the comparison unit.
2. The system of claim 1, wherein the preset time zone is associated with the digital image in response to input.
3. The system of claim 1, wherein the processor is associated with the preset time zone, and wherein the processor is configured to associate the time of capture with the preset time zone.

4. The system of claim 1, wherein the processor is further configured to:
- transmit the location information to a time zone database operatively coupled to the processor, the time zone database configured to store time zones and location information of locations that lie in each of the stored time zones;
- receive, from the time zone database, a time zone in which the transmitted location information lies; and
- adjust the time of capture of the digital image based on the received time zone.

5. The system of claim 4, wherein to adjust the time of capture of the digital image based on the received time zone, the processor is further configured to:
- determine a difference between the received time zone and the preset time zone; and
- offset the time of capture by the difference.

6. The system of claim 5, wherein to offset the time of capture by the difference, the processor is configured to add the difference to the time of capture.

7. The system of claim 1,
- wherein the processor is further configured to display a message indicating a conflict between the time of capture and the time of recording on a display device operatively coupled to the processor, upon determining that the preset time zone is different from the reference time zone, and
- wherein the processor is further configured to receive input to resolve the conflict between the time of capture and the time of recording.

8. The system of claim 1, further comprising a time zone database operatively coupled to the processor, the time zone database configured to store time zones and location information of locations that lie in each of the stored time zones.

9. A computer-implemented method comprising:
- receiving, by data processing apparatus, a digital image captured at a first location at a time of capture in a preset time zone;
- determining, by the data processing apparatus, that the preset time zone is different from a time zone of the first location;
- providing, by the data processing apparatus, a plurality of locations, each associated with a respective time zone;
- receiving, by the data processing apparatus, a selection of a second location from the provided plurality of locations; and
- adjusting, by the data processing apparatus, the time of capture based on the time zone associated with the second location.

10. The method of claim 9, wherein receiving the digital image captured at a first location comprises:
- receiving the digital image from an image capture device;
- receiving location information identifying the first location from a location capture device; and
- associating the digital image with the first location.

11. The method of claim 10,
- wherein the location information includes geographic coordinates identifying the first location, and
- wherein associating the digital image with the first location comprises:
  - storing the geographic coordinates as digital image metadata that includes the time of capture.

12. The method of claim 9, wherein the first location is defined by geographic coordinates recorded at the first location, wherein the geographic coordinates include a time at which the geographic coordinates were recorded,
- wherein determining that the preset time zone is different from a time zone of the first location further comprises:
  - transmitting the geographic coordinates recorded at the first location to a time zone database;
  - receiving, from the time zone database, a time zone associated with the geographic coordinates recorded at the first location; and
  - comparing the received time zone with the preset time zone.

13. The method of claim 9, wherein the plurality of locations are arranged in a hierarchy of locations.

14. The method of claim 9, wherein adjusting the time of capture comprises:
- determining a difference between the time zone that is associated with the digital image and the time zone of the first location; and
- offsetting the time of capture by the difference.

15. A non-transitory computer-readable medium, on which are stored software instructions, executable by data processing apparatus to perform operations comprising:
- receiving a digital image captured at a first location at a time of capture;
- determining that the time of capture is in a preset time zone that is different from a time zone of the first location;
- providing a plurality of locations, each associated with a respective time zone;
- receiving a selection of a second location from the provided plurality of locations; and
- adjusting the time of capture based on a time zone associated with the second location.

16. The medium of claim 15, wherein receiving the digital image captured at a first location comprises:
- receiving the digital image from an image capture device;
- receiving location information identifying the first location from a location capture device; and
- associating the digital image with the first location.

17. The medium of claim 16, wherein associating the digital image with the first location is in response to user input.

18. The medium of claim 16,
- wherein associating the digital image with the first location comprises storing global positioning system coordinates corresponding to the first location as digital image metadata that includes the time of capture.

19. The medium of claim 15,
- wherein the first location is defined by geographic coordinates recorded at the first location, including a time at which the coordinates are recorded,
- wherein determining that the time of capture is in a preset time zone that is different from a time zone of the first location further comprises:
  - transmitting the coordinates to a time zone database that stores coordinates of locations and associated time zones;
  - receiving, from the time zone database, a time zone associated with the coordinates recorded at the location; and
  - comparing the received time zone with the preset time zone.

20. The medium of claim 15,
- wherein providing the plurality of locations are arranged in a hierarchy of locations, and
- wherein a node location represents a continent and children locations of the node location represent collections of one or more countries in the continent, the collections representing corresponding time zones, each collection associated with a corresponding cluster of coordinates that collectively identify the one or more countries in the collection.

21. The medium of claim 20, wherein the operations further comprise:
- transmitting geographic coordinates that collectively identify the one or more countries in the collection to a time zone database.

22. The medium of claim 21, wherein adjusting the time of capture based on a time zone associated with the second location further comprises:
- receiving, from the time zone database, a time zone defined for the one or more countries in the collection; and
- comparing the received time zone with the preset time zone.

23. The medium of claim 15, adjusting the time of capture associated with the digital image further comprises:
- determining a difference between the time zone that is associated with the digital image and the time zone of the first location; and
- offsetting the time of capture by the difference.

\* \* \* \* \*